Dec. 4, 1934.    W. L. HOWE ET AL    1,983,082
ARTICLE OF BONDED GRANULAR MATERIAL AND METHOD OF MAKING THE SAME
Filed June 19, 1930

Inventors
WALLACE L. HOWE
RICHARD H. MARTIN
By Clayton L. Jenks
Attorney

Patented Dec. 4, 1934

1,983,082

UNITED STATES PATENT OFFICE 1,983,082

ARTICLE OF BONDED GRANULAR MATERIAL AND METHOD OF MAKING THE SAME

Wallace L. Howe, West Boylston, and Richard H. Martin, Worcester, Mass., assignors to Norton Company, Worcester, Mass., a corporation of Massachusetts Application June 19, 1930, Serial No. 462,288

5 Claims. (Cl. 51—278)

This invention relates to articles of bonded granular material and particularly to abrasive bodies, such as grinding wheels, which are made of abrasive grains united into an integral structure by cementing or bonding materials matured in place.

Abrasive articles have heretofore been made largely of standard abrasives, such as silicon carbide and crystalline alumina, cemented together by various bonds, such as vitrified ceramic materials, rubber, sodium silicate, shellac, and natural or synthetic resins. Typical of these is the vitrified bond, made up ordinarily of a mixture of various clays and other ceramic materials. The bond in the raw condition and the abrasive grains are mixed and suitably molded to a desired shape, and the bond is then matured by heating it until it vitrifies or fuses and cements the grains together. Such a bond is concentrated largely between the grain surfaces that are closest together and so forms posts or webs interspersed with pore spaces.

It is necessary that grinding wheels and other abrasive articles be inspected and classified by comparison with certain standard bodies in accordance with the hardness or strength of the bonded article, one of the chief characteristics that affects a grinding operation. This has ordinarily been done by noting the penetration and the "feel" of a chisel-like grading tool which a skilled operator attempts to force into the side of the wheel while rotating the tool under a definite pressure and through a given distance. In accordance with the standards created by this crude test, the wheels have been assigned grade letters of which the first letters of the alphabet represent the softer grades or lower strength of bonded article, while the letters near the end of the alphabet represent the harder grades of wheels. This resistance of the article to the penetration of the grading tool has been supposed to represent the tenacity or strength with which the bond cements or holds the abrasive grains together. Based on the principle that a larger percentage of bond in the wheel will give greater bond strength, and ignoring the fact that there are other variables to be considered, it has been attempted, in the prior practice, to make a series of grinding wheels merely by varying the weight of bond per unit weight of abrasive. However, a curve drawn to plot the strength of bonded article against the bond weight used has not been a straight line, but has been very irregular in shape, and the wheels have often come off-grade for unexplainable reasons, and various bond formulas have had to be changed empirically or by a cut-and-try method from time to time to obtain that grade of wheel which the wheel inspector has decided by the penetration test to be correct.

The requirements of the industry have necessitated using many types of processes and producing a large number of kinds of grinding wheels. These wheels have been known to differ not only in the assigned grades but also, and more mysteriously, in their grinding capabilities, and the latter has seemed to depend on the type of process employed in making the wheel, hence the user of the wheel when ordering a duplicate has had to specify the process by which it was made. For example, a wheel having a vitrified ceramic bond may be made by the "puddled" process or by a pressure process involving compacting the unfired mixture in a hydraulic press. In the "puddled" process, the abrasive grains and the raw ceramic bond are mixed with a large amount of water to make a fluid mass and then an unmeasured amount of the mixture is poured into a mold and allowed to dry. The water serves as a plasticizing medium to render the clay moldable. Thereafter the shaped article is fired to mature the bond. The abrasive grains and the bond, in this process, assume such positions as gravity requires. In the pressure process, a mixture of abrasive and bond is slightly moistened with a plasticizing medium, such as a solution of dextrine in water, and then molded under a hydraulic pressure of a definite number of pounds per square inch. It has been considered that such a wheel had a denser structure, or more abrasive per unit volume, than had a puddled wheel and that this difference in density affected the grinding operation. It was not appreciated, however, that such a wheel might have either more or less pore volume than a puddled wheel, depending upon various unrecognized variables which affected the wheel structure. In the manufacture of such wheels, it has been found that although every precaution, as then known, was taken to follow definite bond formulas and to control the manufacturing operations carefully, yet a wheel was often found to have a different grade from that intended. In fact, it has not been possible to make a wheel which would have a desired grinding behavior except by following cut-and-try methods and adopting empirical formulas and processes for its manufacture. Consequently the operation of grading the wheels was essential for determining whether or not the wheel came through process with the required grade or whether it was off-grade and would have to be destroyed or set aside and a new wheel made, with a delay of many weeks' time. Other difficulties have been met, such as the fact that a small sized wheel often could not be made by the same formula and method as was found suitable for producing a large wheel of the same grade.

Heretofore it has been assumed that the abrading characteristics of a grinding wheel were adequately determined by taking into account the kind and the size of the abrasive grains and the kind and the amount of the bond present in the wheel. As the result of our study and experimentation in the effort to solve such problems and to make grinding wheels which would vary by uniform gradations in certain characteristics and which could be easily duplicated by feasible manufacturing methods, we have discovered that there is a fifth variable which must be taken into account in determining the characteristics of an abrasive article. This is the volume percentage of the abrasive material in the article and it must be controlled to give a desired wheel structure. As a corollary, the volumes of the bond and of the pores are to be predetermined percentages of the total volume of the article.

It is accordingly the primary object of this invention to provide a method of making an article of bonded granular abrasive material, in which its essential characteristics have predetermined values, and which may be easily duplicated by feasible manufacturing methods.

A further object is to provide a method of making a set of abrasive articles, such as grinding wheels, in which the articles will have certain structural characteristics of predetermined and uniform values and other characteristics, such as the strength of the bonded article, differing by uniform or regularly varying increments.

A further object of the invention is to provide an article made of granular abrasive material in which the volume structure of the abrasive article is controlled and the proportions of the abrasive grains and pores in this controlled structure are predetermined.

With these and other objects in view as will be apparent to one skilled in the art, this invention resides in the steps of the process and in the structure of an article of bonded granular material as hereinafter described and set forth in the claims appended hereto.

In the drawing, Figs. 1 to 6 illustrate diagrammatically certain relationships of abrasive grains and bond which determine essential characteristics of a grinding wheel;

Figure 1:
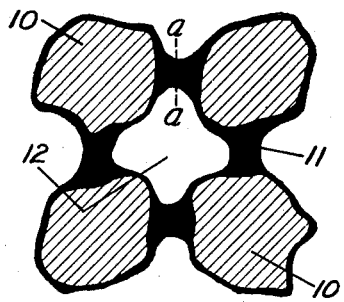
Figure 3:
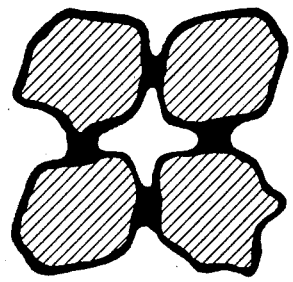
Figure 4:
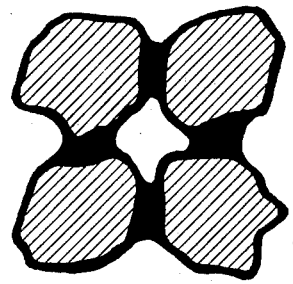

In explanation of our discovery, reference is made to Figs. 1 to 6 of the drawing illustrating various arrangements of four abrasive grains bonded by vitrified ceramic materials, which represent diagrammatically the structure of what is known as a vitrified grinding wheel. These figures are necessarily conventional designs and are not intended to picture any exact arrangement of the grains in a wheel, since some of the grains in an actual wheel structure may be in contact and others slightly spaced apart, and the volume of the pore spaces is determined in large part by how much the grains are permitted to bridge over the spaces in one case or are oriented or forced to assume a denser packing in another case. As shown in Fig. 1, the abrasive grains 10 may be spaced apart by a certain distance as indicated and cemented together by posts or webs 11 of the bond. The latter may be concentrated in the spaces between the grains, thus leaving a pore space 12 between portions of the bond. The strength of the bond which holds the grains together may be roughly indicated by the cross sectional area of the bond at its thinnest portion on the line $a$—$a$ in Fig. 1. This strength of bond is determined by the resistance which it presents to the grading tool when an attempt is made to pry one of the grains 10 from its setting. Figs. 3 and 4 indicate a dense packing of grains, and Figs. 5 and 6 an intermediate packing in which the distance between the grains is less than that shown in Figs. 3 and 4 but greater than those shown in Figs. 1 and 2.

The following table gives various characteristics of certain grinding wheels the structures of which are represented in Figs. 1 to 6:

Table I

| Fig. | Grain, grade, process | Volume percentage | | | Wt./vol. | Ounces of bond |
|---|---|---|---|---|---|---|
| | | Abrasive | Bond | Pores | | |
| 1 | 30-M puddled, loosely packed | 50 | 9.9 | 40.1 | 2.20 | 2¼ |
| 2 | 30-R puddled, loosely packed | 50 | 18.4 | 31.6 | 2.41 | 3¼ |
| 5 | 30-M intermediate density | 54 | 8.8 | 37.2 | 2.32 | 1¾ |
| 6 | 30-R intermediate density | 54 | 16.5 | 29.5 | 2.50 | 3¼ |
| 3 | 30-M densely packed | 57 | 8.0 | 35.0 | 2.40 | 1¼ |
| 4 | 30-R densely packed | 57 | 13.4 | 29.6 | 2.55 | 2½ |
| | 30-P intermediate density | 54 | 13.3 | 32.7 | 2.42 | 2⅔ |
| | 30-K intermediate density | 54 | 6.4 | 39.6 | 2.26 | 1¼ |

Figure 2:
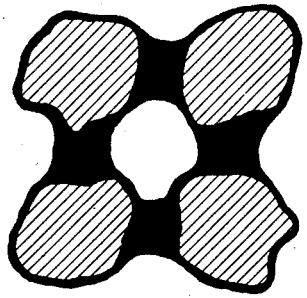

The wheel described in line 1 is illustrated diagrammatically in Fig. 1 and as indicated it has been made to an assigned grade of "M" by bonding abrasive grains of 30 grit size with a vitrified bond. This wheel structure is such that 50% of its volume is made up of abrasive, 9.9% of bond and 40.1% of pores and the total weight per unit of volume is 2.20 grams per cubic centimeter. In order to obtain a harder wheel which will be grade "R", then as shown in line 2 of the table the abrasive volume may remain the same and the bond content be increased to 18.4%, thus lowering the pore content to 31.6%. This "R" grade wheel is illustrated diagrammatically in Fig. 2, and it will be readily appreciated that the main difference between the two wheels of Figs. 1 and 2 is represented in the thickness and amount of the bond between the abrasive grains, and that this thicker post of bond will resist the disruptive action of the grading tool more easily than will the wheel bond of Fig. 1. If it is desired to make a wheel structure having a denser packing, such as by utilizing a hydraulic press, then we have the condition illustrated diagrammatically in Figs. 3 and 4. As indicated in lines 5 and 6 of the table given above, these two wheels may have an abrasive volume percentage of 57, but the proportion of bond in the wheel of grade M (Fig. 3) is 8.0% and in the wheel of grade R (Fig. 4) is 13.4%. It will be seen that the grains are closer together in Figs. 3 and 4 than in Figs. 1 and 2, and that the total amount of bond required to give the same wheel grade or resistance to the disruptive action of the grading tool is less where the grains are close together than when farther apart. This is indicated by the table, which shows that the bond content of the wheel of Fig. 3 is 8.0 as against 9.9 for the bond content of the wheel of Fig. 1.

Figure 5:
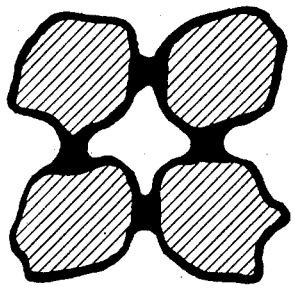
Figure 6:
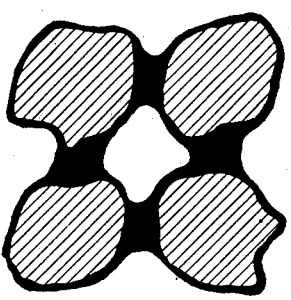

A study of these data and of the theoretical considerations attending them has therefore led us to the conclusion that wheels of intermediate grain packings may be made; and this is indicated in the third and fourth lines of the table and shown in Figs. 5 and 6 of the drawing. As illustrated, there is less bond in the wheel of Fig. 5 than in the wheel of Fig. 1 but more than that found in Fig. 3, although the grades or strengths of the three sets of bonded wheels are alike.

This leads to the further thought that one may make different grades of wheel which have the intermediate packing of abrasive grains. This is indicated in lines 7 and 8 of the table, which show that with the same abrasive volume of 54% of the total volume, as illustrated in Figs. 5 and 6, a wheel of grade P may be made by using 13.3 volume percent of bond and a wheel of grade K may be made by using only 6.4% of bond. It will be observed that the wheels described in lines 5 and 8 of this table have exactly the same bond content of 1¼ ounces of bond per pound of abrasive, (as shown in the last column) but the wheel of line 5 is a dense wheel of grade M having 57% of abrasive while the wheel of line 8 is a less dense wheel of grade K having 54% abrasive, and the actual volume percentages of the bonds are 8.0 and 6.4 respectively. In this case the increase in percentage of the abrasive has resulted in a decrease in percentage of porosity. This shows that using the same amount of bond in two grinding wheels does not necessarily produce the same grade or grinding characteristics.

It will now be apparent that, in accordance with our discovery, each mixture is to be molded to produce a definite weight per unit of volume in the fired article and that the abrasive and the bond are to be used in calculated weight proportions so that they will form predetermined percentages of the total volume of the bonded article. In this way, a controlled structure is obtained. This weight per unit of volume is the yardstick used by the factory for the control and the inspection of the volume structure of the wheels. It, however, has no particular meaning by itself unless the other data are taken into consideration. For example, as shown in table I there are three wheels which have a weight per unit volume of 2.41 ± 0.01 grams per cc., yet these wheels are of entirely different grinding characteristics, that one in line 2 being of grade R, the one in line 5 being a grade M and that in line 7 being a grade P.

Since different percentage volumes of abrasive may be used, it follows that one may make a series of wheels all of the same volume percentage of abrasive but which differ from each other in their wheel grades, and that other series may be made in which the abrasive makes up different percentages of the total wheel volume. It will therefore be necessary in the future to make and designate grinding wheels in accordance with five instead of four variable characteristics. As an illustration of a proper marking for a wheel having these five variables, the marking 3830-M8B indicates the following characteristics: the numeral "38" represents the type of abrasive, "30" the grit size of the abrasive grains, "M" the assigned grade, "8" the volume structure of the bonded article and "B" the type of bond employed. In regard to the numeral "8", this is an arbitrary number taken from the scale of 0 to 10 which indicates the volume percentages of abrasive that may be employed in a given wheel structure, the numeral 5 representing a denser packing of abrasive grains or a higher volume percentage of abrasive in the wheel than does the numeral 8. The process by which a grinding wheel is made need not be known or specified by the user or purchaser of the wheel since it is now no longer necessary that a desired wheel structure be made by any particular process. Since various processes will give the same wheel structure, then that process may be used which is found to be most suitable for obtaining a desired structure.

The nature of this invention will be made more apparent by the following discussion of some of the difficulties met heretofore in this art. If a grinding wheel is to be made of abrasive grains bonded with a ceramic bond, one of the methods known as the "dry press" method as heretofore used has involved mixing the dry ceramic bonding materials with the abrasive grains and wetting them slightly with a temporary plastic binder, such as a solution of dextrine and water, which will hold the mass together until it can be fired to vitrify the bond. On a dry day the water will evaporate more than on a wet day and consequently the plasticity of the mixture will change, and since the material is pressed under a uniform, predetermined pressure and not to a constant volume, the volume occupied by this mixture and therefore the wheel structure may vary from time to time.

It has also been observed in the past that wheels made with shellac or resinous bonds are affected considerably by the humidity of the atmosphere at the time the green mixture is pressed. For example, if the abrasive grains are to be bonded with a synthetic resin known under the trade name of "Bakelite", then on a day of low humidity, a given pressure of, say, one ton per square inch will produce a wheel of a given thickness, while if the humidity is high the thickness may be considerably different for the same weight of mixture in the mold. Therefore, the internal structure of the wheel as made on these two different days will be different; and actual experience has shown that as high as 10% of such resin bonded wheels are likely to come off-grade in the manufacturing process.

Further problems related to the structure of the wheel have also been met in the matter of making small abrasive wheels to duplicate the grinding characteristics of larger wheels. If the wheel compositions are molded by what is known as the jolting process, in which the molds containing slightly moistened mixtures of grain and raw bond are subjected to shocks by being dropped repeatedly for a definite number of times, or for a given time interval, and through a given distance, and if one uses identical compositions and the same procedure in the attempt to make a small wheel which will have the same grinding characteristics as a large wheel, it still is found by experience that the small wheel may actually be several grades harder than the other. This difference may be caused in part by differences in friction of the two mold sides and the impacts received by the grains in the two cases. Hence, in the prior practice, the wheel makers resorted to the expedient of using less bond for making the small wheel and so unwittingly produced a wheel of different structure and different grinding capabilities although of the same grade as the large wheel. This difference is indicated in Table II which shows the volume relationship between a grinding wheel of 16" diameter and 2" thickness, the hole being 1½" in diameter, and a bar which has the dimensions of 22 x 3 x 1½". In each case the abrasive is of 12 grit size and the bond used in the amount of 2½ ounces per pound of abrasive. Each has been jolted for the same length of time and otherwise made by the same process. The bar is found to be about three grades harder than the wheel.

Table II

| | Wt., vol. | Volume percent abrasive | Volume percent bond | Volume percent pores |
|---|---|---|---|---|
| Wheel 16 x 2 x 1½" Bond 2½ oz. Abrasive 12 grit | 2.29 | 51.4 | 10.1 | 38.5 |
| Bar Same composition 22 x 3 x 1½" | 2.5 | 56.2 | 11.3 | 32.5 |

Figure 7:
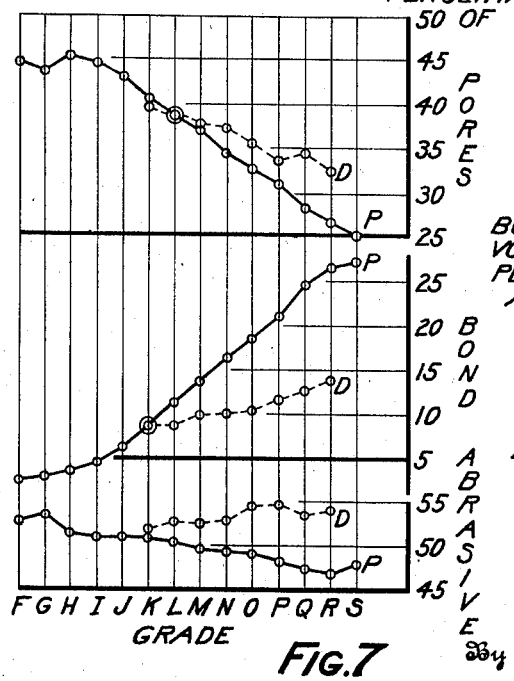
Fig. 7 is a set of curves indicating how wheel structures made by prior methods have varied.

These data show that it is not always possible to obtain the same volume structure by utilizing identical compositions and the same procedure in making two articles of different shapes and sizes. As a graphic illustration of such defects of the prior practice in this art of making grinding wheels reference is had to Fig. 7 which gives three sets of curves, those labeled "P" representing puddled wheels and those labeled "D" representing pressed wheels made of abrasive of 80 grit size. The lower curves represent the volume percentages of the abrasive, the intermediate curves the volume percentages of bond and the upper curves the volume percentages of pores in a series of wheels made in accordance with these two standard methods. As indicated, the wheels having the assigned grade of "K" have substantially the same volume percentages of both bond and abrasive and therefore the wheels are alike, in accordance with the new standards set forth in this case. But for the grade "P", the puddled wheel has an abrasive packing of 48 volume percentage and a bond volume of about 21.0%, the rest of it being pores; while the dense wheel has an abrasive volume percentage of 54.5 and a bond content of 11.5. Hence these wheels of the same grade are radically different in structure.

It will also be seen that the two wheels graded "M" have substantially the same porosity although the amounts of abrasive and bond vary considerably. It is obvious that these wheels must have altogether different grinding characteristics, yet they have been assigned the same grade, as determined by the penetration test. As shown by the curves, the denser wheels throughout the harder grades have actually more pore space than do the puddled wheels and yet it has been supposed that a pressed wheel had less pore space than a puddled wheel. It will also be noted that the curves are irregular in shape and that the volume percentage of abrasive decreases as one goes up the scale from a soft towards a harder wheel, although in wheels of other grain sizes the curve may incline in the other direction. Many other variations will be found in curves drawn to show the characteristics of wheels as formerly made; and the main conclusion to be derived from such figures and data is that the wheels made in accordance with the prior practice have not been of uniformly varying grades and compositions and grinding characteristics and that they have shown all sorts of unaccountable dissimilarities which represented the empirical methods of manufacture as derived by the cut-and-try process. In accordance with our discovery it is now possible to make wheels which fit into a grading system of uniformly differing characteristics.

In view of the above discussion of volume structure, it will now be appreciated that whatever may be the factors which have heretofore influenced the manufacture of such grinding wheels, it will in the future be possible to control the volume structure of the wheels and to produce more uniform products. This is obtained in the case of the jolting operation, not by jolting the wheel mixture for a given length of time but by jolting a definite weight of the green mixture until it has been compacted to a predetermined volume. Likewise, in the case of the pressed wheel, the operator will no longer watch the pressure gauge and press the wheel to a predetermined pressure, but he will employ whatever pressure is required to compact a precalculated weight of the green mixture in the mold until it occupies exactly a given volume.

Figure 8:
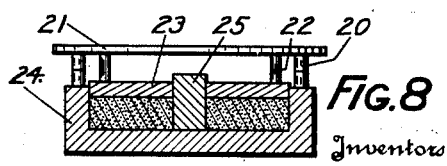
Fig. 8 is a sectional view of an apparatus which may be employed in the practice of this invention.

This may be easily accomplished as illustrated in Fig. 8 of the drawing by having gauge blocks 20 of predetermined thickness which determine the downward movement of plate 21 of the hydraulic press which by means of the ring 22 forces the mold cover 23 downwardly so that when the mold cover has been stopped by these gauge blocks the material present beneath it will occupy a predetermined volume in the mold 24. The core 25 determines the size of the hole in the wheel. It will be understood that wheels of different dimensions but of the same diameter may be made in the same mold by changing the cover, the core and the gauge blocks.

The mold should be made accurately to a predetermined size, so that this desired volume may be obtained. To obtain a definite weight per unit of volume of the completed article and definite volume percentages of the abrasive, bond and pores, as determined by calculations, the wheel maker will now weigh out and mix definite amounts of abrasive and of bond and then compact them in the mold to a volume of predetermined size, irrespective of the amount of water present or of the dryness or stickiness of the plastic bond or of the friction of the walls of the side of the mold or the pressure required or of any other conditions which have heretofore affected the operation of molding grinding wheels. In this way, the volume percentage of the abrasive and of the bond and therefore of the pores will be exactly predetermined. The percentage volume of the ingredients in the green stage or before the bond has been matured does not represent the structural condition after the wheel has been finally finished; but certain constants such as the specific gravity of the abrasive and the matured bond as found in the wheel, are known by the grinding wheel manufacturer, and from these the weights of the raw materials may be calculated.

Figure 9:
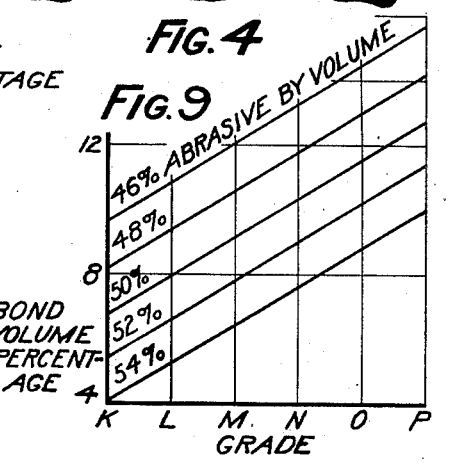
Fig. 9 is a set of curves showing how this invention may be put into practice.

As indicated by the above discussion, we may make a set of grinding wheels of similar types of abrasive and bond, as controlled by laboratory analysis, in accordance with predetermined charts and curves so that they will come to the desired grade and have the desired volume structure. This is illustrated in Fig. 9 of the drawing, which shows a series of curves drawn to represent the relationship of the wheel grade to the volume percentage of the bond in the fired wheel. The bottom curve shows that a series of wheels may be made in each of which the abrasive comprises 54% of the total volume. This particular curve intersects the y-axis at about 4 and the x-axis at K, thus indicating that a "K" grade of wheel is made if the bond content comprises approximately 4% by volume of the wheel structure. If one wishes to make a "P" grade of wheel having the same volume percentage of abrasive then as shown by the curve the bond content will be 10%. Likewise, a series of wheels having 50% of abrasive may be made, and an "L" grade wheel, for example, will result by the use of that amount of raw bond which will give a structure having 8% by volume of the fired bond. The curves are shown as straight lines but, of course, the variations in factory procedure may cause the wheels to vary somewhat from the mathematical accuracy indicated by the curves; nevertheless it is now possible in accordance with this invention to make these several series of wheels which will conform sufficiently accurately to grade standards as to satisfy the exacting demands of the industry.

These various articles will, of course, be made in accordance with practical methods known by those skilled in the art. If a standard vitrified bond is used, then after the article has been molded to give the required weight per unit of volume the bond is matured by firing in a ceramic kiln at a suitable temperature such as 1300° C. If organic or resinous bonds are employed, they will be heated at such temperatures as are found suitable for setting or maturing the bond. Likewise, rubber bonded articles will contain vulcanizing and accelerating agents which serve to vulcanize the rubber. The type of bond and the process employed will be varied to meet the requirements of the industry for any particular article.

In the prior practice, no attempt has been made to keep to such a set of curves in making a series of wheels. Consequently, the abrasive content may have varied and a wheel of one grade would be on one of these curves and a wheel of another grade on another, and the shape of the curve representing these grades and percentages would vary from time to time as factory procedure happened to vary; hence there has been no assured uniformity heretofore in the wheel manufacturing operations because of this lack of control of an unknown variable, i. e. the abrasive volume content, which affected the wheel molding operation.

It might be further observed that to get a harder grade of wheel one may now accomplish this by increasing either the volume percentage of the abrasive or the volume percentage of the bond. If one holds the bond volume constant then an increase in amount of abrasive will necessarily give a wheel of greater strength, as explained above with reference to Figs. 1 to 6 inclusive. It, however, is preferable to hold the abrasive content constant, as indicated by the curves of Fig. 9, and to vary the bond to change the grade of wheel.

One reason why a definite pressure of so many tons per square inch does not give identical products at different times is that the abrasive grains used at two different times may differ somewhat in shape. There are two principal types of grain, one of which is substantially equidimensional and solid in appearance and the other being made up to a large extent of plates and slivers which are generally weak in its structure. The former actually weigh more per unit of bulk volume than do the flakes or slivers and there may be as much as 10% difference in this weight per unit of volume. If two grinding wheels are made up of these two materials and each mixture is subjected to the same number of pounds of pressure per square inch in the molding operation, it is found that the wheel containing the slivers and flakes will have about 8 to 10% less abrasive by weight per unit volume than does the wheel which has been made up of the equidimentional and solid looking abrasive grains. Therefore, these two wheels have different grinding characteristics because of this great difference in the amount of abrasive present.

If one makes the grinding wheels in accordance with our invention from these two different types of abrasive grain and puts the same volume of each grain in the wheel then it is found that the two wheels have substantially the same grinding characteristics. To get identical volume percentages, it will have been necessary to press one of the wheel compositions under a higher hydraulic pressure than the other in order to compact the materials to the same desired volume structure. The rounder type of abrasive grains will pack more easily than do the flakes and slivers, hence to make a wheel having a very dense packing the equidimensional grains should ordinarily be used; while if a loose mixture with large pores is desired, then the flakes and slivers may be employed. This now makes it possible for one to utilize the commercial variations in the shapes of the abrasive grains to good advantage. However, it is not necessary to use any particular type of grain, since if one happens to employ the wrong grain for a given density packing, yet by applying sufficient pressure to the material he will get the desired volume structure.

As an example of utilizing the various shapes of grains for making different types of wheels, it has been found that to grind cutting tools made of the modern hard alloys there is required a grinding wheel of low abrasive volume which is very soft in its grade. A grinding wheel of grade H which has 50% of abrasive per unit volume, as heretofore made by the standard methods, has not been found satisfactory because of the presence of too much abrasive in the body. In accordance with our method it is now possible to make this wheel of a much more open structure by using those grains which have the weaker shape, that is, the flake or sliver shaped grains. By molding this wheel to a desired volume structure it is possible to get as low as 38% of abrasive grains in the wheel, whereas formerly 50% was about the lowest that could be obtained with the regular grain shapes. Hence a wheel of far more satisfactory grinding characteristics is produced.

As a further illustration of an advantage derived from this invention, it has been found that a given grinding wheel made with the "Bakelite" resin bond which has 22.76% of porosity, 23.54% of bond and 53.6% of abrasive material is not satisfactory for grinding certain articles because there is not enough bond present in the mixture to cushion the effects of the grinding operations on the abrasive grains. It is now possible to make up a highly superior wheel of exactly the same grade as determined by the penetration method but which has much less abrasive and more bond in it. Such a wheel may have the following volume proportions: 22.23% porosity, 29.57% bond and 48.1% abrasive. For one type of abrasive wheel bonded with the resinous material it is now possible to get a controlled structure which varies through 20% of porosity, which means a very great difference in the grinding ability of these wheels, although the assigned grade for all of them may be the same.

In the above discussion, particular reference has been made to abrasives and grinding wheels, but it is to be understood that this invention applies to various other products as well. The standard abrasive grains, such as silicon carbide and crystalline alumina, are highly refractory materials and therefore lend themselves to various refractory uses. The heat resistance and the heat conductivity of these bonded articles will depend not only upon the nature of the bond and the particular refractory material employed but also on their relative volume percentages in the article. These volume percentages may now be varied to produce an article of a definite structure. Also, the fact that these articles are porous makes them useful as filters or other gas and liquid permeable bodies. The strength of a tile or other porous article as well as its structure may be accurately predetermined and varied intelligently in accordance with this invention. The claims are therefore to be interpreted broadly as covering granular abrasive and other materials which are bonded into a porous structure, irrespective of the nature of the bond and for whatever purpose the granular material may be intended to serve.

Having thus described our invention, what we claim as new and desire to secure by Letters Patent is:

1. The method of making an abrasive article by molding a mixture of abrasive grains and a raw bond and then maturing the bond, which comprises, in addition to selecting the required size and kind of abrasive grains and the type of bond to be used, measuring out accurately the quantities of the grains and of the raw bond, taking into account the shrinkages involved in drying and maturing the bond of the molded article, which will respectively occupy predetermined volumes in the final product after the bond has been matured, forming a coherable intimate mixture of said grains and bond, placing in an accurately dimensioned mold all of said precalculated quantity of grains and bond and causing the mixture to occupy, prior to maturing the bond, that volume which has been precalculated to be such that, after the bond has been matured, the abrasive grains, the bond and the pores will each constitute predetermined volume percentages of the article and the abrasive characteristics of the article will be determined solely by the precalculated volume percentages of abrasive, bond and pores and the types of the bond and abrasive.

2. The method of making an abrasive article according to claim 1 in which all of the mixture of precalculated quantities of grains and bond, with sufficient plasticizer for a pressure molding operation, is subjected to pressure in the mold of predetermined dimensions so that it will occupy the calculated volume, irrespective of the pressure required, which will give the predetermined volume percentages of grains, bond and pores.

3. The method of making a porous abrasive article of granular abrasive material and bond which will differ from a similar article in a series by a predetermined variation in an abrasive characteristic, comprising the procedure of claim 1 and measuring that quantity of one of said ingredients which has been precalculated to provide the same volume percentage thereof that is found in the other article and measuring that quantity of the other ingredient in the article as precalculated to produce an article which differs by a predetermined increment in the volume percentage thereof from that employed in the other article, and causing the raw mixture to occupy that precalculated volume in the mold, irrespective of the pressure required, which will produce a molded article of such dimensions that after the bond has been matured, it will have the same volume percentage of one ingredient as is found in the other article but will differ in the volume percentage of the other ingredient by a predetermined increment, whereby a series of articles having the same volume percentage of one ingredient but uniform variations in the percentages of pores and the other ingredient may be made.

4. The method of making one of a series of grinding wheels by molding a mixture of abrasive grains and raw bond and then maturing the bond, comprising the procedure of claim 1 and measuring accurately that quantity of abrasive grains of selected grit size and type which has been calculated to give the same volume percentage of abrasive in the finished article as is found in each of the series and measuring that quantity of bond which has been calculated to give a different volume percentage of bond in the finished article from those of the other wheels in the series, and subjecting the raw mixture of grains and bond to pressure in the mold and causing it to occupy that volume, irrespective of the pressure required, which has been calculated to shape the green article to such dimensions, without reference to the volume of another similar pressed article in the series, which will result in the final product having the required volume percentages of grains, bond and pores, whereby a series of wheels of different grinding characteristics but containing the same volume percentage of abrasive throughout the series may be made.

5. The method of making an article of bonded granular abrasive material to be the duplicate of a similar article, comprising the process of claim 1, in which the same kind of abrasive and the same grit size are selected without consideration of the shapes of the grains, and the quantities of the grains and of the raw bond are measured accurately to be the same as those used in the duplicate article, and the mixture in the raw state is pressed in the mold, without considering the pressure applied and irrespective of any differences in the shapes of the grains or variations in the physical characteristics of the mixture that may arise during the process as compared with those of the duplicate article at the same stage, and the mixture is caused to occupy the same volume as was occupied in the mold by the raw mixture of the duplicate article, so that after the duplicated quantities of bond and abrasive have been compressed to the duplicated volume in the mold, the pressed body will then shrink to the same final volume during the operation of maturing the bond as is occupied by the duplicate article.

WALLACE L. HOWE.
RICHARD H. MARTIN.